July 15, 1969 J. A. RITZERT ET AL 3,456,117

MANUALLY OPERABLE CARD READER

Filed March 25, 1966 2 Sheets-Sheet 1

INVENTORS
JOHN A. RITZERT &
JOHN R. LAVERY
BY Louis A Klein
Elmer Wargo
THEIR ATTORNEYS INVENTORS
JOHN A. RITZERT &
JOHN R. LAVERY
BY Louis A Kline
Elmer J Wargo
THEIR ATTORNEYS United States Patent Office 3,456,117
Patented July 15, 1969

3,456,117
MANUALLY OPERABLE CARD READER

John A. Ritzert, Dayton, and John R. Lavery, Kettering, Ohio, assignors to The National Cash Register Company, Dayton, Ohio, a corporation of Maryland Filed Mar. 25, 1966, Ser. No. 537,518
Int. Cl. G01n *21/30*
U.S. Cl. 250—219 6 Claims

ABSTRACT OF THE DISCLOSURE

A manually-operated photoelectric card reader which sequentially reads successive columns of holes in the card being read, as the card is manually pulled through the reader. A control handle, movable between "ready" and "read" positions, is used to energize a light source at a reading station in the reader and to enable the card being read to be manually pulled past the reading station when the handle is moved to the "read" position. Gate members are used to automatically adjust the width of a passage in the reader through which the card passes in accordance with the width of the specific card being read. An inclined plane and a cylindrical roller are used to prevent double reading of the cards being read.

This invention relates to an apparatus for reading data from record forms, and more particularly it relates to a manually-operated photoelectric card reader which sequentially reads successive columns of holes or light-transmitting areas in the card being read as the card is manually pulled through the reader.

A need exists for an inexpensive and reliable apparatus for reading records containing data or information in patterns of punched holes or light-transmitting areas and for feeding this data read to a utilization device such as a computer, a card punch, etc., or other equipment to be controlled thereby.

The card-reading apparatus of this invention is reliable and inexpensive to produce and comprises a housing having a throat passage through which the card being read may pass. The card to be read is inserted into the throat passage and is brought to a stop therein by control means within the housing. When the card is properly aligned and positioned within the throat passage for reading, the control means is manually moved to the "read" position, which movement energizes the photoelectric means at the reading station in the housing and also permits the card to be grasped and to be manually pulled past the reading station and out of the housing. Means are provided to apprise the utilization device of the specific column being read as the columns of data are successively moved past the reading station. Means are also provided to prevent the double reading of the data as it is moved past the reading station. After the card being read is pulled through and out of the throat passage, the photoelectric means are deenergized.

Card readers utilizing photoelectric reading means are known. One such reader is shown in United States Patent No. 3,036,765, which issued to Jack D. Jones and Robert W. Kettlety on May 29, 1962; however, the card reader shown in that patent reads the information while the card being read is held stationary therein.

In contrast with the above, applicants' card reader is adaptable to read the data in the cards successively, column by column, as each card is pulled past the reading station therein. Means are provided for sensing each card to determine when it is in reading relationship with the reading station in the housing, and also for insuring an aligned passage of the card past the reading station. A control means movable between "ready" and "read" positions is used to energize the light source at the reading station and to enable the card being read to be moved past the reading station in reading relationship therewith when the control means is moved from said "ready" position to said "read" position. Means are also provided to apprise the utilization device of the specific column being read and to prevent a double reading thereof.

Accordingly, a primary object of this invention is to provide a compact, inexepensive card-reading apparatus which is reliable for use in electronic data-processing equipment.

Another object is to provide a compact, inexpensive manually-operable card reader which has means therein to maintain the card being read in proper alignment in the reader while it is pulled past the reading station therein.

A still further object is to provide a card reader of the above type with means for preventing the double reading of the data contained in the cards.

These and other objects and advantages will become more readily understood in connection with the following description and the drawings, in which.

Figure 1:
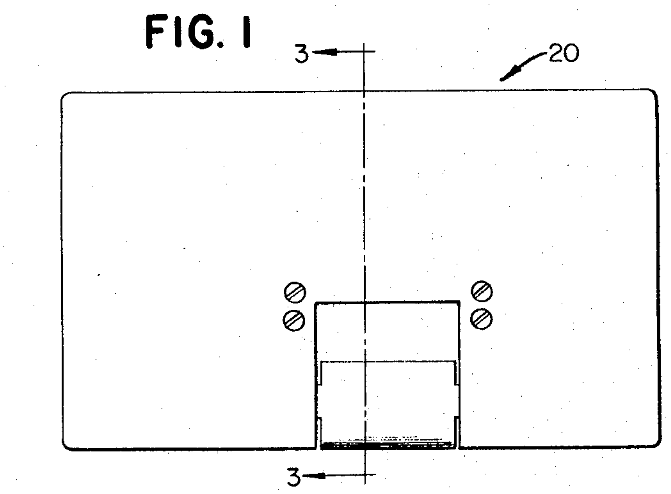
FIG. 1 is a plan view of the top of the card reader apparatus of this invention.
Figure 2:
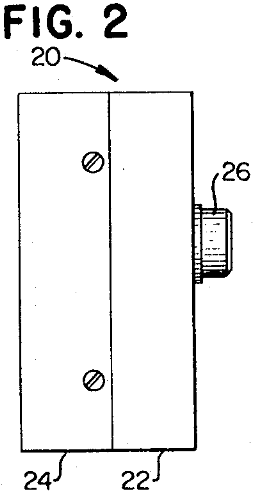
FIG. 2 is an elevational view of the right side of the apparatus shown in FIG. 1.
Figures 3, 6, 7, 9:
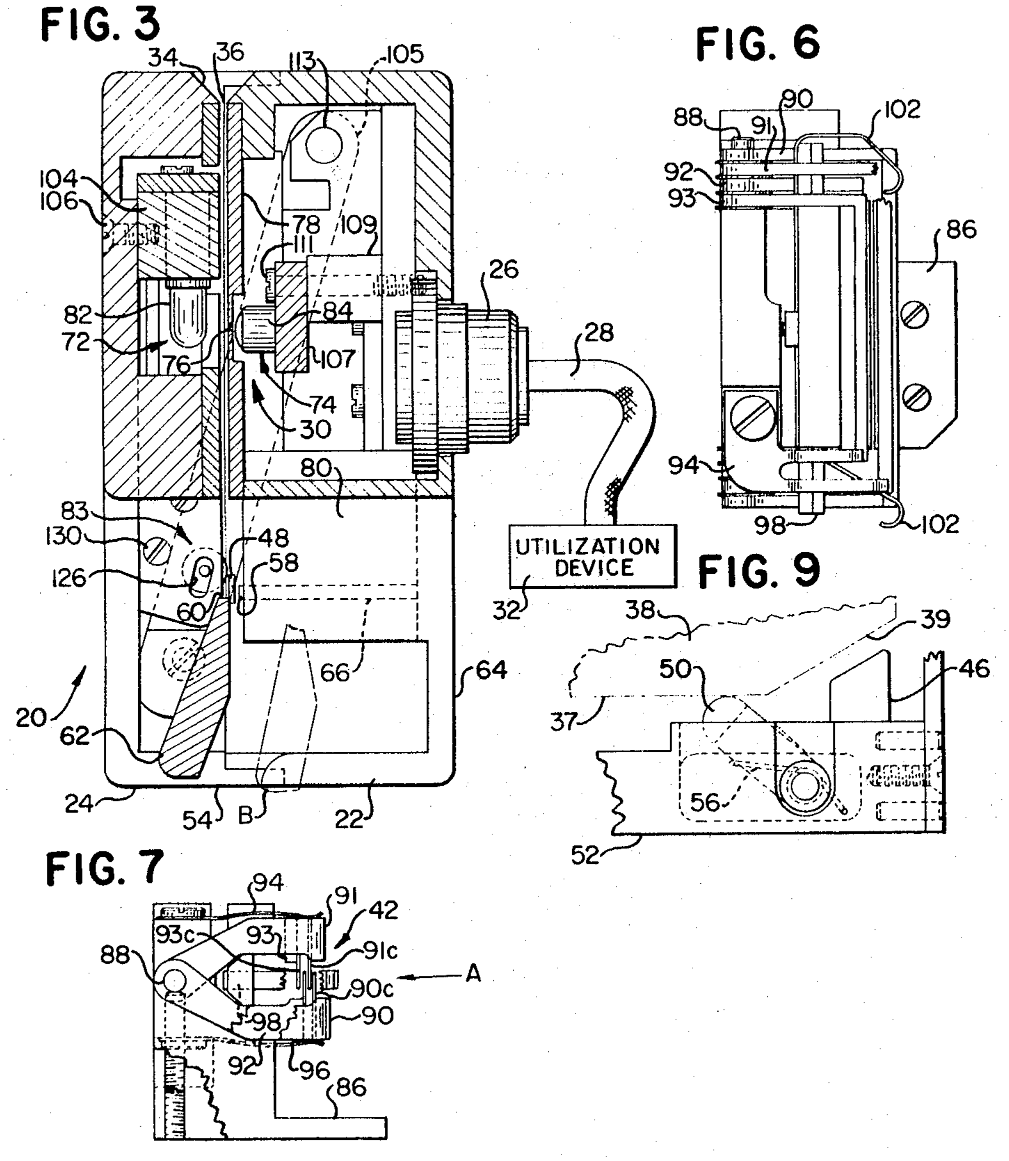
FIG. 3 is an elevational view in cross section taken along the line 3—3 of FIG. 1 and showing the lower and upper halves of the housing of the apparatus and the throat passage through which the cards being read pass.
FIG. 6 is an enlarged plan view of the gate means shown in FIG. 4.
FIG. 7 is a elevational view of the gate means shown in FIG. 6.
FIG. 9 is an enlarged plan view of the miter sensing means shown in FIG. 4, which sensing means cooperates with a mitered corner on the card being read to permit the control means to be moved to "read" position.

The card-reading apparatus of this invention, designated generally as 20, comprises a housing made up of lower and upper halves 22 and 24, respectively, as shown in FIGS. 1, 2, and 3. The halves 22 and 24 are made of suitable light-proof materials, such as metal or opaque plastics, which have the joining edges secured together by known light-proofing techniques. A known multi-pronged plug and socket connector 26 is provided in the lower half 22 of the housing along with a multi-cable carrier 28 to connect the reading station, designated generally as 30, with utilization device 32, which may be a computer, a card punch, or other equipment to be controlled by the data from the card reader 20.

One side of card reader 20 is provided with a beveled recess area 34 leading into a throat passage 36, which is formed between the lower and upper halves 22 and 24, respectively, of the housing, as shown in FIG. 3, which recess area receives the card or document to be read.

The card 38 which is to to be read by the card reader 20 may be of the usual variety, having data recorded therein in the form of either rectangular or circular holes, or the data may be present in the form of transparent areas in an opaque card. The card 38 to be read is manually inserted into the recess 34 shown in FIG. 3, and it is pushed into the throat passage 36.

Figures 4, 5, 10:
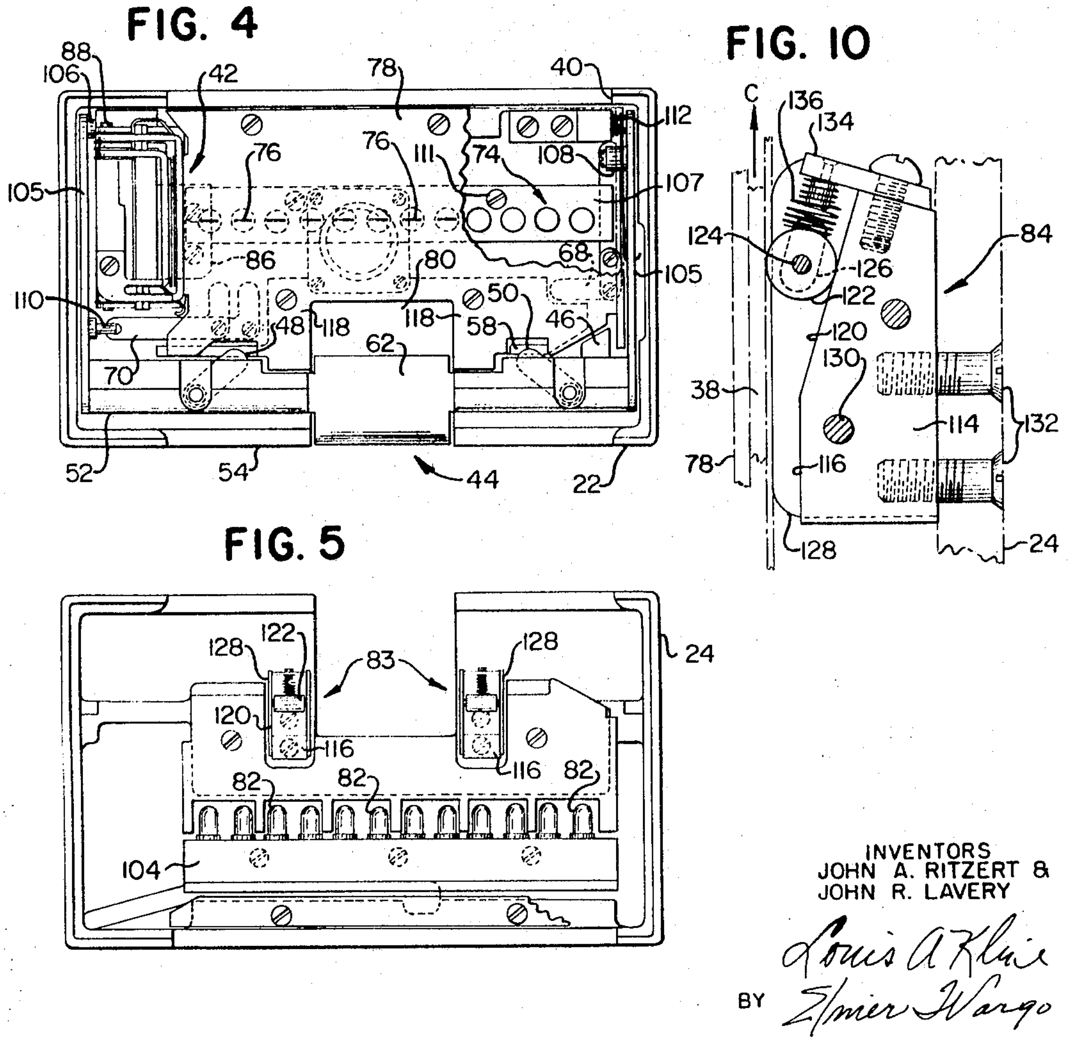
FIG. 4 is a plan view of the lower half of the housing shown in FIG. 3, showing the control means for preventing the operation of the reader until the card being read is properly aligned within the throat passage, and the gate means for adjusting the width of the throat passage according to the width of the card passing therethrough.
FIG. 5 is a plan view of the underside of the upper half of the housing shown in FIG. 3, showing the means for preventing double reading of a card passing through the reader apparatus.
FIG. 10 is an enlarged side view of the means for permitting the card to move in only one direction through the throat passage which is shown in FIG. 3.

As the card 38 is pushed into the throat passage 36, one edge of the card comes into contact with a fixed side 40 of the throat passage 36, and the other edge engages a gate means, designated generally as 42, which is located on the oppositie side of the throat passage 36, as shown in FIG. 4. The gate means 42 automatically establishes the width of the throat passage 36 according to the specific width of the card being read, to insure that the card will be aligned properly with a minimum of skewing as it passes the reading station 30. The gate means 42 provides an adjustable fixed stop and compensates for varying widths of cards due to the varying conditions of temperature, moisture, etc., and the details thereof will be described later. The gate means 42 is important, since it enables the length of the throat passage along the direction of card travel to be greatly reduced to provide for a compact card reader.

As the card is pushed still farther into the throat passage 36, the leading edge 37 of the card 38 comes into contact with control means designated generally as 44 (FIG. 4), provided that the card being read is properly inserted within the throat passage 36. The leading edge 37 of the card being read is provided with a mitered corner 39, which is complementary to the abutment member 46 when the card is properly inserted in the throat passage, as shown in FIG. 9.

When the mitered corner 39 of the card being read is properly inserted in the throat passage 36 and pushed inwardly, the leading edge of the card 38 engages pivotal members 48 and 50, which are pivotally secured to a control bar 52 (FIG. 4), and pushes them towards the side 54. The pivotal members 48 and 50 are urged by springs 56 away from the side 54, so as to lie above the support 58 (FIG. 3) and thereby prevent the bar 52 and the handle 62 from being moved from the "ready" position, in which it is shown in FIGS. 3 and 4, to the "read" position, B, shown in phantom outline (FIG. 3), unless the card to be read is properly inserted in the throat passage 36.

When the leading edge 37 of a card 38 pushes the pivotal members 48 and 50 towards the side 54, and the edge 37 abuts against the leading edge 60 of the handle 62, the pivotal members are moved clear of the support 58, and the handle 62 may be pushed downwardly towards the base 64, as shown in FIG. 3, to the position B, shown in phantom outline. The pivotal members 48 and 50 are carried by the bar 52 and slide down along the side 66 of the support 58 as the handle 62 is pushed downwardly.

When the handle 62 is moved to the "read" position, it is effective to close switches 68 and 70, as shown in FIG. 4, which respectively energize the light source, designated generally as 72, and indicate to the utilization device 32 that a new card is to be read. The light source 72 is positioned on one side of the throat passage 36, and light-responsive means 74 is positioned on the opposite side, as shown in FIG. 3. Suitable openings or slots 76 are made in the cover plate 78 and are spaced therein to be aligned with the rows of holes or transparent areas appearing in the card as data to be read.

After the handle 62 is moved to the "read" position, the operator merely inserts his fingers into the notched area 80 (FIG. 4), formed in the assembled housing, and grasps the leading edge 37 of the card 38 positioned therein (not shown in FIG. 4) and pulls the card past the reading station 30.

As the card 38 is pulled past the reading station 30, the data contained in the card is read successivly, column by column. The light source means 72 is composed of a light source 82 for each row of information appearing in the card, and the light-responsive means 74 is similarly composed of a light-responsive element 84 for each such row of information.

Each light source 82 and each light-responsive element 84 are positioned at the read station 30 in aligned relationship with the pertaining opening 76 appearing in the cover plate 78 (FIGS. 3 and 4). The card being read is opaque except for the light-transmitting areas therein, so that the light-responsive elements 84 are energized only when light passes through a light-transmitting area in the card and the particular opening 76 for the row of information in the column being read.

It should be noted that all row positions of a particular column of a card are read concurrently, and the columns of data in the card are read successively as the card is pulled past the reading station. An additional row of holes or transparent areas may be placed in the cards being read, to be used to apprise the utilization device 32 of the specific column of data being read as the card is pulled past the reading station 30. In the alternative, one of the rows normally used for data may be provided with a light-transmitting area in every column to provide a "timing row" which would energize the particular light-responsive element each time a column of data is read. In this respect, the operator may pull the card being read past the reading station at any speed, and the utilization device 32 would always be apprised properly of the column being read.

The usual tabulatng card may have twelve rows of data arranged in eighty columns. Because the leading edge 37 of the card 38 being read must push the pivotal members 48 and 50 to permit the handle 62 to be moved to the "read" position, the portion of the card between the leading edge and the reading station cannot be read. In the specific embodiment shown, approximately sixty of the eighty columns were read at the reading station. The specific number of columns available for reading may be changed somewhat by changing the location of the reading station 30 relative to the pivotal members 48 and 50.

Positioned between the reading station and the pivotal members 48 and 50 is a means 83 (FIG. 5) for preventing double readings of data in the card as the card is pulled past the reading station 30. This means 83, which will be described later, permits the card to be pulled in only one direction through the throat passage 36.

As the card being read is pulled through the throat passage 36, the card itself prevents the handle 62 from returning to the "ready" position. When the trailing edge of the card passes through the throat passage 36 and clears the handle 62, the handle 62 returns to the "ready" position, shown in FIG. 3, to open the switches 68 and 70 and shut off the reading station 30. The card-reading apparatus 20 may then be used to read another card in a similar manner.

When any card to be read is placed in the throat passage 36, one side of the card engages the gate means 42, referred to earlier and shown in FIGS. 4, 6, 7, and 8. The gate means 42 controls the width of the throat passage 36 and is provided with a base 86, which is secured to the lower half 22 of the housing. The base 86 is provided with a hole in which a shaft 88 is inserted.

The gate means 42 is also provided with a plurality of gate or jaw members 90, 91, 92, and 93, which are pivotally mounted on the shaft 88 and which are urged by springs 94 and 96 to the closed position, shown in FIGS. 4, 6, and 7. A bar 98, positioned between the jaw members and secured to the base 86, is used to limit the extent to which the jaw members 90 to 93 move toward one another into the closed position.

Each of the jaw members 90 to 93 is provided with a planar guiding member 90C to 93C, respectively, which is placed on an appropriate side of the pertaining jaw member so as to provide a plurality of spaced stops when the jaw members are in the nested and closed position, shown ni FIG. 7.

Figure 8:
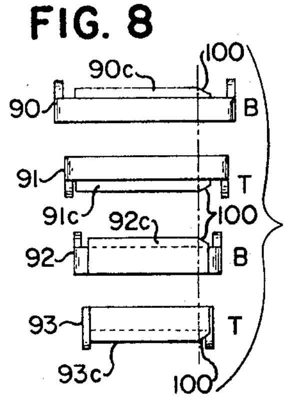
FIG. 8 is an exploded elevational view of the individual camming members on the gate means looking from the direction A of FIG. 7.

The leading edges of the planar guiding members 90C to 93C are provided with camming surfaces 100, which are in aligned relationship, as shown in FIG. 8, and face the throat recess area 34. When a particular card to be read is inserted into the throat passage 36, one edge of the card slides against the fixed side 40, shown in FIG. 4, and the other edge engages the gate means 42. If, for example, the specific card width is much wider than the normal size, the card edge engages the camming surfaces 100 of perhaps the innermost three jaw members 90 to 92 (those closest to the fixed side 40) and moves these away from the closed position shown against the bias of springs 94 and 96. As the remaining jaw member, 93, was not cammed out of the path of the incoming card to be read, the planar guiding member 93C will provide a fixed lateral stop which will determine the throat width for the specific card being read and will also provide a guiding surface for maintaining the card in alignment through the throat passage 36. The free ends of leaf springs 102, secured to the base 86, extend into the throat and are also used to help maintain the card being read in an aligned direction by urging the card against the fixed side 40 as it passes trough the throat passage 36 and past the reading station 30.

The light source elements 82 may be conventional lamps which are mounted in a bracket 104, secured to the upper half 24 of the housing by screws 106. The light-responsive elements 84 may be of the known photo-resistive or photo-voltaic types, depending upon the particular needs of the utilization device 32 with which the reader is used. The light-responsive elements 84 are mounted in support blocks 107 and 109 (FIG. 3), which are secured to the base 64 by screws 111. Each of the elements 84 is connected by conductors (not shown) to the connector 26 and to the utilization device 32 by known circuitry (not shown). As was stated earlier, one row of the card to be read is provided with a hole or light-transmitting area in every one of the columns to be read, so that the utilization device 32, such as a card punch, may be apprised of the specific column being read and thereby accurately reproduce the data cointained in the card. Each of the pulses produced from this row would be utilized by a known indexing mechanism associated with the utilization device 32 to insure that it is properly synchronized with the card reader.

The switches 68 and 70 are operatively connected to the control means 44 by a pair of arms 105, each arm 105 having one end thereof secured to the bar 52, and the remaining end being pivotally joined to a shaft 113, which is secured to the lower half 22 of the housing, as shown in FIG. 4. The control means 44 is pivoted in the housing via the arms 105 from the "ready" position, shown in FIG. 3, to the "read" position, shown in phantom outline at B.

Upon movement of the control means 44 to the "read" position, a projection 108 (FIG. 4) on one of the arms 105 closes the switch 68 to energize the lamps 82. During the same movement, another projection 110, on the other arm 105, closes the switch 70, which is a reset switch and informs the utilization device 32 that a new card is about to be read. When the card is pulled through the throat passage 36 and out of the housing, the control means 44 returns to "ready" position through the urging of a spring 112, and the switches 68 and 70 return to the open position.

Means 83 are provided to prevent double reading of the data in the card as the card being read is pulled through the throat passage 36. One such means 83 is positioned on each side of the notch 80 of the housing, as shown in FIG. 5. Each means 83 includes a block 114 (FIG. 10), which has a flat surface 116, which is parallel to the flat area 118 of the plate 78 in the lower half 22 of the housing, and a flat inclined area 120, which is inclined to the flat surface 116. A cylindrical roller 122 is rotatably mounted on a shaft 124, the ends of which are inserted through notches 126 in side plates 128, which are secured to the block 114 by screws 130. The block 114 is secured to the upper half 24 of the housing by screws 132, and a bracket 134 (FIG. 10) is secured to the block 114 and supports a spring 136, which urges the roller 122 towards a wedging engagement between the flat area of the plate 78 and the flat inclined area 120.

As long as a card 38 is pulled in the direction shown by arrow C in FIG. 10, the roller 122 will roll somewhat and compress the spring 136, permitting the card to be pulled correctly through the throat passage. However, if the operator attempts to push the card into the throat passage in a direction opposite to arrow C, the roller 122 will immediately wedge the card 38 against the flat area 118 of the plate 78 of the lower half 22 of the housing and thereby prevent the operator from pushing the card back into the throat passage, which may cause a double reading of the data in the card when the card is again pulled past the reading station 30.

What is claimed is:

1. An apparatus for reading a record medium containing data in the form of an array of rows and columns of light-transmitting areas and for transferring the data read to a utilization device, said apparatus comprising:

a housing having entrance and exit openings and throat passage means interconnecting said openings and through which said record medium may pass, said throat passage having a length along the direction of medium travel therethrough which is short when compared to the length of the medium being read;

light source means and light-responsive reading means positioned in said throat passage means, said light source means being adapted, when energized, to send light through columns of said light-transmitting areas successively, and to produce a separate electrical signal in said reading means for each light-transmitting area appearing in each row position in the column being read as the record medium is moved past said reading means in reading relationship therewith, means for sensing said record medium to determine when it is in reading relationship with said reading means, control means movable between "ready" and "read" positions and adapted to energize said light source means when moved to said read position, the record medium being read being manually pulled past said reading means in reading relationship therewith, means to enable the record medium being read to be moved in only one direction past said reading means when in reading relationship therewith and being located between said exit opening and said reading means and comprising:

a planar member and a block member mounted in spaced relation in said housing on opposed sides of said throat passage means, said block member having an inclined surface diverging from said planar member and towards said exit opening, and roller means rotatably mounted in said housing and means to resiliently urge said roller means into contact with said planar member and said inclined surface, said roller means being adapted to permit said record medium to pass between said roller means and said planer member when moved in the direction towards said exit opening but adapted to wedge said record medium against said planar member when an attempt is made to move said record medium in the direction of said entrance opening, and thereby prevent movement of the record medium in this latter direction.

and means for delivering said electrical signals to said utilization device.

2. An apparatus for reading a record medium containing data in the form of an array of rows and columns of light-transmitting areas and for transferring the data read to a utilization device, said apparatus comprising:

a housing having entrance and exit openings and throat passage means interconnecting said openings and through which said record medium may pass, light source means and light-responsive reading means positioned in said throat passage means, said light source means being adapted, when energized, to send light through columns of said light-transmitting areas successively, and to produce a separate electrical signal in said reading means for each light-transmitting area appearing in each row position in the column being read as the record medium is moved past said reading means in reading relationship therewith, means for sensing said record medium to determine when it is in reading relationship with said reading means, control means movable between "ready" and "read" positions and adapted to energize said light source means when moved to said read position, the record medium being read being manually pulled past said reading means in reading relationship therewith, said housing having a fixed wall forming one side of said throat passage means, gate means positioned in said housing and forming the opposed side of said throat passage means, said gate means being adapted to automatically establish a fixed width for said throat passage means and provide an elongated guide surface, which width is dependent upon the width of the particular record medium being inserted in said throat passage means, and means for delivering said electrical signals to said utilization device.

3. The apparaus as claimed in claim 3 in which said gate means are pivotally mounted in said housing and comprise a plurality of planar guiding members secured thereto, said planar guiding members being positioned in said throat passage means at different distances from said fixed wall for guiding record mediums having different widths through said throat passage means.

any said planar guiding member which is positioned from said fixed wall at a distance which is less than the width of the record medium to be read being adapted to be pivotally moved out of said throat passage means by the record medium being inserted therein so that the next adjacent one of said planar guiding members which remains in said throat passage means provides a fixed stop for guiding the record medium therethrough.

4. The apparatus as claimed in claim 3 in which said gate means comprise a plurality of generally C-shaped upper and lower jaw members of different sizes which are pivotally mounted in said housing and spring means urging said jaw members into a closed, nested position, each of said jaw members having a generally planar guiding member extending therefrom so that said guiding members will be in spaced, parallel, and overlapping relation with one another and will be parallel to said fixed wall of said housing and to the direction of travel of said record medium through said throat passage means when said jaw members are in said closed, nested position, each said planar guiding member also being adapted to lie in said throat passage means when said jaw members are in said closed nested position and also having a camming surface facing said entrance opening, said guiding members being adapted to be positioned in said throat passage means at different distances from said fixed wall for guiding record mediums having different widths through said throat passage means, any said planar guiding member which is positioned from said fixed wall at a distance which is less than the width of the record medium to be read being adapted to be pivotally cammed out of said throat passage means by the record medium being inserted therein engaging the pertaining said camming surface so that the next adjacent one of said planar guiding members which is not pivotally moved out of said throat passage means provides a fixed stop for guiding the record medium therethrough.

5. The apparatus as claimed in claim 3 further comprising means to enable said record medium to be moved in only one direction past said reading means when in reading relationship therewith and including:

a planar member and a block member mounted in spaced relation in said housing on opposed sides of said throat passage means, said block member having an inclined surface diverging from said planar member and towwards said exit opening, roller support means secured in fixed relation to said housing, roller means rotatably supported on said roller support means and spring means to urge said roller means into contact with said planar member and said inclined surface, said roller means being adapted to permit said record medium to pass between said roller means and said planar member when moved in the direction towards said exit opening but adapted to wedge said record medium against said planar member when an attempt is made to move said record member in the direction of said entrance opening and thereby prevent movement of the record medium in this latter direction.

6. A compact manually operable reader for reading punched cards containing data in the form of an array of rows and columns of holes, comprising;

a housing having a throat passage through which a punched card may pass and also having an opening to permit the leading edge of the card to be grasped when the card is partially inserted in said throat passage in a first position therein from which a reading operation is commenced, a reading station within said housing, means having a plurality of adjustable fixed stops within said throat passage for guiding the card to be read translationally past said reading station so as to read parallel columns of holes in the card successively and to read all holes in the column being read concurrently, said throat passage having a length along the direction of card travel therethrough which is short when compared to the length of card being read, said reading station comprising light-responsive elements with one such element for each of the holes of said row of holes appearing in the column being read and also comprising light source means adapted to send a light ray through all holes appearing in the card in the column being read and thereby selectively energize the pertaining said light-responsive elements and produce an electrical signal for the specific row positions of holes in the column being read, control means movable between "ready" and "read" positions, and means within said throat passage cooperating with the card to be read for determining when it is properly positioned in said throat passage to be read, said control means when in said read position being effective to energize said light source means, said card being read being manually pulled past said reading station and through said throat passage out of said housing to thereby successively read the columns therein, and means adaptable for transmitting said electrical signals to a utilization device which uses the data from said reader.

References Cited

UNITED STATES PATENTS

| | | | |
|---|---|---|---|
| 2,007,391 | 7/1935 | Bryce | 235—61.115 X |
| 2,039,832 | 6/1936 | Palmer. | |
| 2,573,405 | 10/1951 | Clark | 235—61.115 X |
| 3,139,519 | 6/1964 | Reinschmidt | 235—61.111 |
| 3,352,981 | 11/1967 | Ekers | 235—61.111 X |
| 2,600,817 | 6/1952 | Victoreen. | |

OTHER REFERENCES

Rohland, IBM Technical Bulletin vol. 8, No. 10, March 1966.

ARCHIE R. BORCHETT, Primary Examiner

C. M. LEEDOM, Assistant Examiner

U.S. Cl. X.R.

235—61.115